United States Patent
Tsengas

(10) Patent No.: US 7,089,882 B1
(45) Date of Patent: *Aug. 15, 2006

(54) CAT LITTER

(76) Inventor: Steven Tsengas, 1300 East St., Fairport Harbor, OH (US) 44077

( * ) Notice: Subject to any disclaimer, the term of this patent is extended or adjusted under 35 U.S.C. 154(b) by 0 days.

This patent is subject to a terminal disclaimer.

(21) Appl. No.: 11/126,732

(22) Filed: May 12, 2005

Related U.S. Application Data

(63) Continuation-in-part of application No. 10/886,544, filed on Jul. 9, 2004, which is a continuation-in-part of application No. 10/886,545, filed on Jul. 9, 2004.

(51) Int. Cl.
*A01K 29/00* (2006.01)
*B01J 20/00* (2006.01)
*B01J 20/22* (2006.01)

(52) U.S. Cl. .................. 119/171; 119/172; 119/173; 502/400; 502/401

(58) Field of Classification Search ............... 119/171, 119/172, 173; 502/400, 401
See application file for complete search history.

U.S. PATENT DOCUMENTS

| | | | |
|---|---|---|---|
| 4,437,429 A | * | 3/1984 | Goldstein et al. |
| 4,721,059 A | * | 1/1988 | Lowe et al. |
| 5,230,305 A | * | 7/1993 | House |
| 5,507,250 A | * | 4/1996 | Reddy et al. |
| 5,690,052 A | * | 11/1997 | Sladek |
| 6,098,569 A | * | 8/2000 | Kent et al. |
| 6,543,385 B1 | * | 4/2003 | Raymond et al. |

* cited by examiner

*Primary Examiner*—Humera N. Sheikh
(74) *Attorney, Agent, or Firm*—John D. Gugliotta

(57) ABSTRACT

A cat litter product is provided and includes manufacture primarily from modified corn starch which is processed through mash distillation. The litter product is pelletized via an extrusion technology process so as to form particles the size of wheat grain. The litter product provides, collectively, a non-toxic and naturally safe, biodegradable, odor-eliminating, scented, anti-bacterial litter that clumps in a convenient size for easy disposal and which has little dust and reduces tracking by cats.

12 Claims, No Drawings

CAT LITTER

RELATED APPLICATIONS

This application is a Continuation in Part of U.S. application Ser. No. 10/886,544 and 10/886,545, both filed on Jul. 9, 2004, both which claim the benefit of U.S. Pat. No. 6,817,315 issued on Nov. 16, 2004.

BACKGROUND OF THE INVENTION

1. Field of the Invention

The present invention relates generally to cat litter and, more particularly, to a cat litter possessing anti-odor and anti-microbial agents which is biodegradable and provides easy cleanup and lessens cat tracking.

2. Description of the Related Art

The cat litter industry is filled with a variety of litters that provide, collectively, a non-toxic and naturally safe, biodegradable, odor-eliminating, scented, anti-bacterial litter that clumps in a convenient size for easy disposal and which has little dust and reduces tracking by cats. Many litter formulas offer some combination of the aforementioned qualities, however, no litter offers each of these advantages in one litter formula.

Accordingly, a need has arisen for an improved cat litter formula offering the aforementioned advantages in one comparably priced formula. The development of the improved cat litter fulfills this need.

A search of the prior art did not disclose any patents that read directly on the claims of the instant invention; however, the following references were considered related.

The following patents disclose mushroom spawn formulations: U.S. Pat. No. 6,073,388, issued in the name of Kananen et al.; U.S. Pat. No. 6,029,394, issued in the name of Kananen et al.; and U.S. Pat. No. 6,041,544, issued in the name of Kananen et al.

The following patents disclose litterbox fillers: U.S. Pat. No. 4,721,059, issued in the name of Lowe et al.; U.S. Pat. No. 5,230,305, issued in the name of House; U.S. Pat. No. 6,216,634 B1, issued in the name of Kent et al.; and U.S. Pat. No. 5,690,052, issued in the name of Sladek.

The following patents disclose alcohol production and recovery processes: U.S. Pat. No. 5,416,245, issued in the name of MacGregor et al.; and U.S. Pat. No. 4,309,254, issued in the name of Dahlstrom et al.

The following patents disclose a process of supplying methionine to a ruminant: U.S. Pat. No. 3,968,253, issued in the name of Bertram et al.; and U.S. Pat. No. 4,044,169, issued in the name of Bertram et al.

U.S. Pat. No. 5,730,371 issued in the name of Dongieux, Jr. et al. discloses a device and a process for delumping pasty masses in waste materials from paper manufacture.

U.S. Pat. No. 5,770,138, issued in the name of Yoder discloses a method of making enhanced non-clay granules made from pulp or paper sludge.

U.S. Pat. No. 4,015,026, issued in the name of Burkwall, Jr. et al. discloses a process for preparing a moist pet food additive, and a resultant pet food.

U.S. Pat. No. 4,560,527, issued in the name of Harke et al. discloses a method of making agglomerated cellulosic particles using a substantially horizontal rotating drum.

U.S. Pat. No. Re 28,700, issued in the name of Berger discloses an antibiotic which is active against gram-positive and gram-negative bacteria and produces growth stimulation and increased feed efficiency in poultry.

U.S. Pat. No. 5,003,995, issued in the name of Kersey discloses compositions and articles for stimulating taste receptors.

U.S. Pat. No. 5,360,823, issued in the name of Griffel, Jr. et al. discloses an anionic salt formulation for milk fever.

U.S. Pat. No. 5,250,182, issued in the name of Bento et al. discloses a membrane-based process for the recovery of lactic acid and glycerol from a corn thin stillage stream.

U.S. Pat. No. 5,242,292, issued in the name of Wenger discloses an extruder apparatus for producing sterile pelleted feed product.

And, U.S. Pat. No. 4,828,846, issued in the name of Raco et al. discloses a human food product produced from dried distillers spent cereal grains and solubles.

Consequently, a need has been felt for a cat litter possessing anti-odor and anti-microbial agents which is biodegradable and provides easy cleanup and lessens cat tracking.

SUMMARY OF THE INVENTION

Therefore, it is an object of the present invention to provide an improved cat litter that is non-toxic and naturally safe.

It is another object of the present invention to provide an improved cat litter that is biodegradable.

It is another object of the present invention to provide an improved cat litter that is odor-eliminating.

It is another object of the present invention to provide an improved cat litter that is scented.

It is another object of the present invention to provide an improved cat litter having anti-microbial agents.

It is another object of the present invention to provide an improved cat litter that clumps in a convenient size for easy disposal and which has little dust and reduces tracking by cats.

It is another object of the present invention to provide an improved cat litter which includes manufacture from modified corn starch.

Briefly described according to one embodiment of the present invention, an improved cat litter is provided and includes manufacture from modified corn starch, Yucca Schidigera, anti-microbial agents, anti-odor agents, zeolite, distilled dried grains, and sodium bicarbonate for improving the litter density and for improving cost production.

Modified corn starch is a polysaccharide, which are the most common agents used in providing the cohesiveness, or clumping, of litter when used. Among the suitable agents that may additionally be used for clumping are dextrins, maltodextrins, flours, cellulosics, hemicellulosics, and the many varieties of starches.

Yucca Schidigera is a plant typically found in the desert regions of Arizona, California, Nevada, Utah and Mexico. Among its many properties, the Yucca Schidigera's ability to bind and neutralize ammonia is relevant to the cat litter formula. Natural saponins, which are emulsifying or foaming agents, are found in the leaves of the Yucca Schidigera and are the chemicals responsible for binding and neutralizing the annoying and harmful odors associated with the ammonia formed in the lifter after the breakdown of urea, which is found in cat urine. The natural saponins may also act to neutralize the odors associated with cat feces, as Yucca Scutigera is also used in animal foods to help neutralize feces odor within the intestinal tract of an animal so that when the feces are passed the odor is less objectionable. In addition to the natural saponins from Yucca Scutigera, additional anti-odor agents may be added to further curb the smell generated from waste deposited in the cat litter.

Anti-microbial agents are also added to help curb the initiation and development of microbes that may be harmful to cat and cat owner, such as molds. The anti-microbial agents may come from among sodium propionate, calcium propionate or other known chemicals. In addition to the agents suggested, additional anti-microbial compounds may be included with those already suggested so as to provide maximum protection against the formation of microbes, bacteria or molds.

The general method of manufacture of the cat litter formula is comprised of a mash distillation process and an extrusion technology process.

DETAILED DESCRIPTION OF THE PREFERRED EMBODIMENT

A. Composition

An improved cat litter is provided, according to the present invention, comprised of a composition which includes the following ingredients: polysaccharide (modified corn starch); zeolite; yucca schidegira; distillers dried grains and/or sawdust; salt compound (sodium bicarbonate); and anti-microbial agents. The sawdust utilized in the improved cat litter is a scrap product, readily available and used as a lower cost filler to replace distillers dried grain of the parent application, but can also be used in combination with some percentage of distillers dried grains to provide a cedar, pine, or other pleasant odor if utilizing sawdust or shavings from the appropriate types of wood.

Each of the aforementioned ingredients may have one or more sub-components. For example, the salt compound is preferably sodium bicarbonate, however, potassium carbonate and calcium carbonate are envisioned as being selected alone or in combination.

Yucca schidegira, as a natural saponin, is an emulsifying or foaming agent which functions to inhibit urease enzyme action and to prevent the formation of $NH_3$ (ammonia), thereby binding and neutralizing annoying and harmful odors associated therewith. Yucca schidegira further serves to help neutralize feces odor.

The anti-microbial agents, preferably including sodium propionate and calcium propionate, facilitate protection against the formation of microbes, bacteria, or molds.

Zeolite is a natural mineral consisting of silica and alumina. Zeolite has a unique interconnecting lattice structure arranged to form a honeycomb framework of consistent diameter interconnecting channels and pores. Negatively-charged alumina building blocks and neutrally-charged silica building blocks are stacked thereby producing an open, three dimensional honeycomb framework. Odors and gases such as ammonia are attracted to and trapped within the zeolite crystalline structure. Zeolite also adsorbs and desorbs water, thus eliminating and preventing mildew formation.

Modified corn starch is a polysaccharide which serves in the production of alcohol and provides cohesiveness, or clumping of litter. While other cereal grains such as wheat, barley, and rye may be selected, modified corn starch is preferred. In addition, other suitable agents facilitating occlusivity or clumping may include a mixture of dextrins, maltodextrins, flours, and arabinoxylans.

B. Method Of Manufacture

In practicing the present invention, the general method of manufacture is comprised of a mash distillation process which includes grinding corn into a coarse modified flour called meal. The meal is mixed with water and a malt enzyme, preferably alpha-amylase, and is passed through cookers where starch is liquefied. Heat is applied to enable liquefaction using cookers with a high temperature stage and a lower temperature holding period, wherein a mash product is produced. The high temperature stage facilitates reduced bacteria levels in the mash product. The mash product is then cooled and an additional malt enzyme is added to convert liquefied starch to fermentable sugars. The additional malt enzyme selected includes gluc amylase and beta-amylase, however, gluc amylase is preferred. Yeast, preferably *saccharomyces cerevisiae*, is then added in order to ferment the sugars to ethanol and carbon dioxide. *Saccharomyces cerevisiae* is the preferred yeast species because it facilitates quick, efficient production of alcohol and possesses a high alcoholic concentration tolerance. Fermented mash results and is sent to distillation, wherein ethanol is extracted, leaving spent mash. The spent mash is centrifuged, where liquid is separated therefrom. The liquid, or stillage, is reintroduced into the cooking system and sold as livestock feed, or is partially dehydrated into a syrup. The aforementioned mash distillation process is executed under controlled pH being adjusted and readjusted in a suitable manner as is commonly practiced in such industry.

The mash distillation process creates two main co-products in the production of ethanol, namely carbon dioxide and distillers grains. The distillers grains are rich in protein, fat, minerals, vitamins, and amino acids, and thus serve as a highly valued livestock feed ingredient.

Next, centrifuged spent mash (distillers dried grains) is suitably dried into a powder to which the following ingredients are added to form a litter product: modified corn starch, zeolite, yucca schidegira, sodium bicarbonate, and anti-microbial agents. The litter product is suitably dried to a powder and is processed through a pelletizer via an extrusion technology process so as to form particles each having a size approximating the size of a grain of wheat. The particles are then bagged and sealed.

C. Example

The following example represents the general formulation for the improved cat litter of the present invention.

| INGREDIENTS | COMPOSITION BY WEIGHT |
|---|---|
| Polysaccharide (Modified Corn Starch) | 19.5–21%, preferably 20.00% |
| Zeolite | 4.5–5.5%, preferably 5.00% |
| Yucca Schidegira | 0.15–0.25%, preferably 0.20% |
| Blend of Distillers dried grain and/or Sawdust or Wood Shavings | 71.50–71.75%, preferably 71.70% |
| Sodium Bicarbonate | 2.95–3.05%, preferably 3.00% |
| Anti-microbial Agents | 0.085–0.105%, preferably 0.10% |

D. Operation of the Preferred Embodiment

To use the present invention, user simply opens the improved cat litter from its sealed packaging and pours a suitable volume thereof within a container fabricated of a material specifically adapted for use as an animal litter storage receptacle.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. An animal litter consisting essentially of:
   a filler selected from the group consisting of sawdust, wood shavings, and a blend of distillers dried grains and sawdust;
   modified starch, wherein said combination of said filler and modified starch form particles tending to agglomerate when wetted;
   yucca schidegira to inhibit urease enzyme from converting urine to ammonia, thereby neutralizing ammonia production; and
   zeolite for binding ammonia and water, thereby neutralizing ammonia production and mildew formation.

2. The animal litter of claim 1, further comprising a density increasing agent.

3. The animal litter of claim 2, wherein said density increasing agent comprises calcium carbonate.

4. The animal litter of claim 1, wherein said composition is extruded and pelletized to form granules.

5. The animal litter of claim 4, wherein said granules form particles tending to self reduce in size to a size that remains acceptable for use in absorption and clumping of animal waste without further mechanical size reduction.

6. The animal litter of claim 1, wherein said modified starch is modified to improve mixing and processing characteristics.

7. The animal litter of claim 6, wherein said modified starch is gelatinized starch.

8. The animal litter of claim 1, wherein said sawdust or wood shavings is selected from the group consisting of pine and cedar and a combination of said woods.

9. A method of sorbing an aqueous liquid utilizing a filler formed of wood shavings or sawdust, said method comprising the steps of:
   adding modified starch such that the filler and modified starch combination form particles tending to agglomerate when wetted;
   adding yucca schidegira to inhibit urease enzyme from converting urine to ammonia, thereby neutralizing ammonia production; and
   adding zeolite for binding ammonia and water, thereby neutralizing ammonia production and mildew formation.

10. The method of claim 9, further comprising the step of adding a density increasing agent.

11. The method of claim 10, wherein said density increasing agent comprises calcium carbonate.

12. The method of claim 9, further comprising the step of extruding and pelletizing to form granules, wherein said granules form particles tending to self reduce in size to a size that remains acceptable for use in absorption and clumping of animal waste without further mechanical size reduction.

* * * * *